(12) United States Patent
Gulla et al.

(10) Patent No.: US 8,372,775 B2
(45) Date of Patent: Feb. 12, 2013

(54) CATALYST FOR OXYGEN REDUCTION

(75) Inventors: Andrea F. Gulla, Malden, MA (US); Robert J. Allen, South Harwich, MA (US); Emory S. De Castro, Nahant, MA (US)

(73) Assignee: Industrie de Nora S.p.A., Milan (IT)

( * ) Notice: Subject to any disclaimer, the term of this patent is extended or adjusted under 35 U.S.C. 154(b) by 842 days.

(21) Appl. No.: 11/789,986

(22) Filed: Apr. 26, 2007

(65) Prior Publication Data

US 2007/0219086 A1 Sep. 20, 2007

Related U.S. Application Data

(62) Division of application No. 10/830,182, filed on Apr. 22, 2004, now Pat. No. 7,879,753.

(60) Provisional application No. 60/473,543, filed on May 27, 2003.

(51) Int. Cl.
*B01J 21/18* (2006.01)
*B01J 23/40* (2006.01)
*B01J 23/74* (2006.01)
*B01J 27/02* (2006.01)
*B01J 27/047* (2006.01)
*B01J 27/051* (2006.01)
*B01J 27/049* (2006.01)
*B01J 27/043* (2006.01)
*B01J 27/045* (2006.01)

(52) U.S. Cl. ........ 502/185; 502/216; 502/219; 502/220; 502/221; 502/222; 502/223

(58) Field of Classification Search .................. 502/185, 502/216, 219–223
See application file for complete search history.

(56) References Cited

U.S. PATENT DOCUMENTS

| | | | | |
|---|---|---|---|---|
| 3,840,389 A | * | 10/1974 | Kobylinski et al. | 427/333 |
| 5,051,389 A | * | 9/1991 | Lang et al. | 502/185 |
| 5,166,362 A | * | 11/1992 | Forquy et al. | 549/83 |
| 6,649,300 B2 | * | 11/2003 | Ito et al. | 429/44 |
| 2007/0197376 A1 | * | 8/2007 | Potapova et al. | 502/263 |

\* cited by examiner

*Primary Examiner* — Patricia L Hailey
(74) *Attorney, Agent, or Firm* — Eschweiler & Associates, LLC

(57) ABSTRACT

A method of producing a catalyst for oxygen reduction and a gas diffusion electrode.

8 Claims, No Drawings

CATALYST FOR OXYGEN REDUCTION

PRIOR APPLICATIONS

This application is a division of U.S. patent application Ser. No. 10/830,182 filed Apr. 22, 2004, now U.S. Pat. No. 7,879,753, which claims the benefit of Provisional patent application Ser. No. 60/473,543 filed May 27, 2003.

FIELD OF THE INVENTION

The invention relates to a novel ruthenium sulfide catalyst and to gas diffusion electrodes incorporating the same for reduction of oxygen in industrial electrolyzers. The catalyst is highly resistant towards corrosion, thus resulting it particularly suitable for use in oxygen-depolarized aqueous hydrochloric acid electrolysis.

STATE OF THE ART

The electrolysis of aqueous HCl solutions is a well known method for the recovery of high-value chlorine gas. Aqueous hydrochloric acid is an abundant chemical by-product, especially in chemical plants making use of chlorine as a reactant. In this case, the chlorine evolved in the anodic compartment of the electrolyzer can be recycled as a feedstock to the chemical plant. Electrolysis becomes extremely attractive when the standard hydrogen-evolving cathode is replaced by an oxygen-consuming gas diffusion electrode due to the associated decrease in energy consumption. The ability of the gas diffusion electrode to operate successfully in this context is crucially dependent on the nature and performance of the catalyst, and also on the structure of the gas diffusion electrode.

Platinum is generally acknowledged as the most effective catalyst for the electroreduction of oxygen in a wide range of conditions. The activation of gas diffusion electrodes with platinum-based catalysts is well known in the art, and finds widespread application in fuel cells and electrolyzers of many kinds. However, the case of aqueous HCl electrolysis poses some serious drawbacks to the use of platinum as a cathodic catalyst, as it is inevitable for the gas diffusion cathode to come at least partially in contact with the liquid electrolyte, which contains chloride ion and dissolved chlorine.

First of all, platinum is susceptible to chloride ion poisoning which negatively affects its activity toward oxygen reduction and a second source of poisoning is constituted by contaminant species, especially organic species, which are in most of the cases dissolved in the by-product hydrochloric acid and undergoing electrolysis. Even more importantly, the combined complexing action of hydrochloric acid and dissolved chlorine gas changes the platinum metal into a soluble salt which is dissolved away, making this material inappropriate for use in gas diffusion electrodes. Furthermore, extremely careful precautions have to be taken during the periodic shut-downs of the electrolyzers, otherwise the sudden shift in the cathodic potential, combined with the highly aggressive chemical environment, causes the dissolution of a significant amount of catalyst, and the partial deactivation of the remaining portion. While tailored procedures for planned shut-downs of the electrolyzers can be set up for additional costs, little or nothing can be done in the case of a sudden, uncontrolled shut-down due to unpredictable causes like power shortages in the electric network.

These problems have been partially mitigated with the disclosure of some rhodium based catalysts, which have proven to be less active than platinum toward the oxygen reduction reaction, but less affected by the chloride ions present in the system, thus giving more than acceptable results in terms of operating voltage upon incorporation in gas diffusion electrodes. In particular, the rhodium metal/rhodium oxide catalyst disclosed in U.S. Pat. No. 5,958,197 proved also quite resistant to the hydrochloric environment in the presence of dissolved chloride and oxygen, although it requires cumbersome activation procedures to fully develop its corrosion resistant form.

U.S. Pat. No. 6,149,782 discloses an even more resistant catalyst based on rhodium sulfide, which doesn't require any activation step and which shows the additional advantage of being insensitive to organic contaminants in the acid feedstock. Although these catalysts show very good performances both in terms of activity and of chemical resistance in the harsh environment associated with aqueous hydrochloric acid depolarized electrolysis, their price and availability is a big issue in terms of effective commercial exploitation. As it is well known to the experts in the field, rhodium is by now the most expensive of noble metals, its price exceeding even that of osmium and being one order of magnitude, for instance, that of ruthenium and iridium; although depolarized aqueous hydrochloric acid electrolysis is a technology with a high market demand, the price of the state of the art catalysts is therefore too high to allow commercialization to be successful.

Among the noble metals of reasonable price that could be useful for oxygen reduction in acidic media, ruthenium would be apparently an obvious choice, its activity being comparable to the one of rhodium and its price being, on average, about twenty times lower. $RuO_2$ prepared by aqueous precipitation from $RuCl_3$ is a well-known catalyst. Unfortunately, its chemical stability (prior to a thermal stabilization) in chlorine-saturated hydrochloric media is poor and the catalyst is dissolved away in a relatively short time. Other sulfides seem to follow the same fate unless the material is thermally stabilized. Up to this day, rhodium sulfide prepared via aqueous precipitation offers a good alternative (see U.S. Pat. No. 6,149,782). Ruthenium sulfide obtained in a likewise manner proved to be hardly stable in a chlorine-saturated hydrochloric environment. The only similar catalyst for oxygen reduction disclosed in the prior art, the Chevrel phase type catalyst, namely $Mo_xRu_yS/C$, is also unstable at elevated temperature and acid concentration (see J. Chem. Soc., Faraday Trans., 1996, 92, 4311).

OBJECTS OF THE INVENTION

It is an object of the invention to provide a catalyst for oxygen reduction chemically stable in a hydrochloric environment in the presence of dissolved chloride and optionally of dissolved oxygen overcoming the drawbacks of the prior art.

Under another aspect, it is an object of the present invention to provide a gas diffusion electrode incorporating a catalyst for oxygen reduction for use in depolarized hydrochloric acid electrolysis cells.

Under a further aspect, it is an object of the present invention to provide a method for producing a catalyst for oxygen reduction chemically stable in a hydrochloric environment in the presence of dissolved chloride and optionally of dissolved oxygen, overcoming the drawbacks of the prior art, and a method for producing a gas diffusion electrode incorporating the same.

These and other objects and advantages of the invention will become obvious from the following detailed description.

THE INVENTION

Under a first aspect, the catalyst of the invention consists of a chemically stable form of supported ruthenium sulfide. Since the catalyst of the invention is directed to the use in gas diffusion cathodes for depolarized hydrochloric acid electrolysis, in the following description by "chemically stable form", it is intended a form chemically stable in a hydrochloric acid environment and also in the presence of dissolved chlorine and optionally of dissolved oxygen.

Under a second aspect, the gas diffusion electrode of the invention comprises a conductive web, preferably a carbon cloth, coated with a chemically stable form of supported ruthenium sulfide catalyst optionally mixed with a hydrophobic binder. Under a third aspect, the method for producing the catalyst of the invention comprises subjecting a conductive support to incipient wetness impregnation with a precursor of ruthenium and optionally of another transition metal, drying the impregnated support and treating the resulting product under an atmosphere comprising hydrogen sulfide.

Under a fourth aspect, the method for producing the catalyst of the invention comprises subjecting a supported ruthenium oxide compound, optionally carbon supported $RuO_2$, to a sulfidation reaction in an atmosphere comprising hydrogen sulfide. Under a fifth aspect, the method for producing the gas diffusion electrode of the invention comprises coating an electrically conducting web with the catalyst of the invention optionally mixed with a hydrophobic binder, and optionally sintering the coated web.

In one preferred embodiment, the catalyst of the invention is a binary compound of the formula $Ru_xS_y$. In a more preferred embodiment, the catalyst of the invention is a ternary compound of the formula $Ru_xM_yS$, wherein M is a generic transition metal. In another preferred embodiment, the catalyst of the invention is a mixed sulfide of ruthenium and more than one other generic transition metal. In a still more preferred embodiment, the catalyst of the invention is a ternary sulfide of ruthenium and another transition metal selected from cobalt, nickel, rhenium, chromium, molybdenum and iridium.

Although the ruthenium sulfide catalysts previously known in the art, traditionally obtained via wet chemistry from aqueous solutions of ruthenium precursors with hydrogen sulfide, or from organic solutions of ruthenium precursors with elementary sulfur, show poor performances in terms of chemical stability in hydrochloric acid containing dissolved chlorine, the inventors have surprisingly found that ruthenium sulfide catalysts obtained via gas-solid reactions are stable in the same environment while retaining a satisfactory electrocatalytic activity. In one preferred embodiment, incorporation of the catalyst of the invention into gas diffusion electrode structures is facilitated by supporting the catalyst on a conductive inert support, such as carbon black. In this case, it is preferred that the carbon support be a high surface area carbon black, for instance carbon black having a surface area exceeding 120 $m^2/g$.

In one preferred embodiment, the catalyst of the invention is a chemically stable form of a ruthenium and cobalt sulfide of the formula $Ru_xCo_yS$, wherein the Ru:Co atomic ratio is preferably comprised between 1:5 and 5:1, more preferably about 3:1, for instance, comprised between 2.8:1 and 3.2:1.

The ruthenium sulfide catalysts of the prior art are obtained according to a procedure which is very similar to the one used for the preparation of rhodium sulfide as disclosed in U.S. Pat. No. 6,149,782, that is by sparging hydrogen sulfide into an aqueous solution of a ruthenium precursor, usually a chloride, optionally in the presence of a conductive inert support. The precipitate is then normally dried and thermally treated. Ruthenium catalysts obtained in this manner are however scarcely stable in a hydrochloric environment, especially if dissolved chlorine is present.

The ruthenium sulfide catalysts of the invention are conversely obtained by a gas-Solid reaction: a conductive inert support, preferably high surface area carbon black, is not dispersed in an aqueous solution of the precursor but rather subjected to incipient wetness impregnation with the same. For this purpose, it is useful that the precursor solution contain 2-propanol, or an equivalent, preferably water-miscible, volatile solvent. The precursor solution may be sprayed on the powdery support, or the solution may be slowly added to the support until it can be absorbed. When the incipient wetness impregnation of the support is completed, the resulting impregnated support must be carefully dried, preferably under vacuum at a temperature exceeding 90° C. This operation usually requires a few hours and the resulting dried product is finally subjected to the sulfidation reaction under an atmosphere comprising hydrogen sulfide, preferably in a flow reactor.

In another preferred embodiment, the starting material for obtaining the catalyst of the invention is a supported ruthenium oxide, for example a carbon supported ruthenium dioxide known in the art. This supported ruthenium oxide is subjected to a gas-solid sulfidation reaction under an atmosphere comprising hydrogen sulfide, preferably in a flow reactor, as in the previous case. In both cases, hydrogen sulfide is preferably diluted with nitrogen or with another inert carrier. Nitrogen/hydrogen sulfide mixtures having a molar ratio comprised between 0.5 and 4 are preferably used.

Incorporation of the catalyst of the invention in a gas diffusion electrode structure useful as cathode for depolarized hydrochloric acid electrolysis can be accomplished in several ways, as known to those skilled in the art. In one preferred embodiment, the gas diffusion electrode of the invention is obtained by coating a conductive web, for instance a carbon cloth, with a paste including the catalyst of the invention optionally mixed with a first polymeric binder, for instance a hydrophobic binder. As the binder, perfluorinated binders such as PTFE are preferably used, but also partially fluorinated or non fluorinated binders can be sued. The catalyst/binder mixture can be applied onto the conductive web directly, to obtain a so called "flow-through" gas diffusion electrode.

In another embodiment, the conductive web can be previously coated on one or both sides with a mixture of a conductive filler (e.g. carbon black) and a second binder. The first and the second binder may in some cases be the same material. Once coated with the catalyst/binder mixture, the gas diffusion electrode is normally dried prior to its use. In some cases, it may be advantageous also to sinter the electrode prior to its use, according to a well established procedure in the field of gas diffusion electrode manufacture. Nevertheless, the inventors have surprisingly found that, when incorporating the catalyst of the invention to a gas diffusion electrode structure, the sintering step may be advantageously omitted.

Although the catalyst of the invention results very stable also when it is not sintered, sintering may be carried out to improve the long term stability of the overall gas diffusion electrode structure. In this case, the best results are obtained when a first heating ramp, from ambient temperature to about 100-120° C., is carried out under a reducing atmosphere (for instance a hydrogen atmosphere), while the final thermal treatment, which normally reaches temperatures of 300-350° C., is effected under argon or other inert gas.

In the following examples, there are described several preferred embodiments to illustrate the invention. However, it is to be understood that the invention is not intended to be limited to the specific embodiments.

EXAMPLE 1

10 g of Vulcan XC-72 carbon black powder from Cabot Corp./USA, having a surface area of about 230 $m^2/g$, was subjected to incipient wetness impregnation with a 2-propanol solution of $RuCl_3.3H_2O$ (37.8% Ru) and $Co(NO_3)_3.6H_2O$ (20.2% Co) precursor salts and an atomic ratio of 3:1 (Ru:Co) was used. The solution was slowly added to the carbon black powder as long as the poured liquid could be completely adsorbed. The solvent was evaporated in a vacuum oven at 110° C. and dried overnight. The resulting product was later sulfided in a flow reactor for a one hour period at 400° C. under a 2:1 $N_2$ and $H_2S$ atmosphere. The same atmosphere was maintained also while cooling down the sample after completion of the gas-solid reaction. A carbon black supported $Ru_xCo_yS$ catalyst was obtained, as confirmed by XRD data.

EXAMPLE 2

The same procedure of example 1 was repeated on 10 g of Vulcan XC-72 powder, the only difference being that the precursor salt solution only contained $RuCl_3.3H_2O$ in 2-propanol, with no cobalt precursor added. As a result, a carbon black supported $Ru_xS_y$ catalyst was obtained, as confirmed by XRD data.

EXAMPLE 3

$RuO_2/C$ prepared by precipitation from $RuCl_3$ solution with acid carbonate at pH 5 in the presence of carbon, or by an oxidation reaction involving Ru sulfite acid ($H_3Ru(SO_2)_2OH$) and hydrogen peroxide ($H_2O_2$), also in the presence of carbon, is a catalyst known in the art. In the present case, this type of catalyst was converted into a stable form of ruthenium sulfide according to the invention by means of a gas-solid reaction. 20 g of Vulcan XC-72 carbon black powder were dispersed in an aqueous solution, to which 20 g of $RuCl_3.1.5H_2O$ were added. The ruthenium oxide intermediate was precipitated by slow addition of a $NaHCO_3$ solution with a concentration of 6.7% by weight. The resulting product was dried and subsequently sulfided in a flow reactor for a two hour period at 400° C. under a 2:1 $N_2$ and $H_2S$ atmosphere. The same atmosphere was maintained while cooling down the sample after completion of the gas-solid reaction. A carbon black supported $Ru_xS_y$ catalyst was obtained, as confirmed by XRD data.

COMPARISON EXAMPLE 1

Gaseous $H_2S$ was sparged in an aqueous solution of $RuCl_3.3H_2O$ containing finely dispersed Vulcan XC-72 carbon black powder. The resulting precipitate was calcined at 650° C. for two hours under argon atmosphere. As a result, a carbon black supported $Ru_xS_y$ catalyst was obtained, as confirmed by XRD data.

EXAMPLE 4

The catalysts of Examples 1, 2 and 3 and Comparative Example 1 were subjected to an accelerated stability test in the same chemical environment of hydrochloric acid electrolysis, but in much more severe temperature conditions. A sample of each catalyst was immersed in 100 ml of anolyte liquor from a laboratory HCl electrolysis cell, consisting of an aqueous HCl solution with dissolved chlorine, initially at room temperature. The vessels containing the liquor dispersed catalyst samples were then heated and held at boiling temperature (about 103° C.) for 20 minutes. After completing the test, the liquor in the vessels containing the catalysts of examples 1, 2 and 3 was still colorless, while the liquor containing the catalyst of Comparative Example 1 had turned brown. A subsequent analysis on the three solutions showed only small traces of ruthenium in the case of vessels containing catalysts from examples 1, 2 and 3, while in the case of Comparative Example 1, analysis showed that an extensive ruthenium leach out occurred.

EXAMPLE 5

The catalysts of Examples 1 and 2 were mixed with a PTFE dispersion and incorporated into conventional flow-through gas diffusion electrode structures on carbon cloth. After applying the PTFE/catalyst paste to the cloth and drying the same, each of the two electrodes was cut into four pieces, three of which were subjected to different sintering procedures. The following samples were thus obtained:

Samples 1a and 1b: $Ru_xCo_yS$ and $Ru_xS_y$, respectively, sintered in $H_2$ up to 100° C., holding temperature for 30 minutes, then switching to Ar and ramping up to 335° C., holding temperature for 15 minutes.

Samples 2a and 2b: $Ru_xCo_yS$ and $Ru_xS_y$, respectively, sintered in Ar up to 335° C. and holding temperature for 15 minutes.

Samples 3a and 3b: $Ru_xCo_yS$ and $Ru_xS_y$, respectively, sintered in air up to 335° C. and holding temperature for 15 minutes.

Samples 4a and 4b: non-sintered $Ru_xCo_yS$ and $Ru_xS_y$, respectively.

All of the eight samples were coated with 0.5 to 0.8 $mg/cm^2$ of perfluorocarbon ionomeric solution, as customary in the art of depolarized hydrochloric acid electrolysis. The eight ionomer-coated samples were subjected to the same stability test in 20 minutes HCl electrolysis cell anolyte liquor, while bubbling oxygen in the boiling electrolyte, and the following colors were displayed by the corresponding solutions:

Sample 1a: very pale yellow
Sample 1b: colorless
Sample 2a: dark yellow
Sample 2b: light orange
Sample 3a: bright orange
Sample 3b: dark orange/brown
Sample 4a: colorless
Sample 4b: colorless These qualitative data were later found matching those obtained through the determination of ruthenium via XRF analysis on the different solutions. The electrodes sintered in hydrogen followed by argon were by far more stable compared to the other sintering procedures, with air-sintering giving the worst results. What is nevertheless surprising is that non-sintered electrodes proved at least as stable as those sintered in hydrogen and the stability data for non-sintered electrodes matched those of the raw catalyst prior to incorporation in a gas diffusion electrode structure.

EXAMPLE 6

Electrodes equivalent to Samples 1a, 1b, 2a, 3a and 4a were prepared in 50 $cm^2$ size and compared to a standard $RhS_x$ electrode for hydrochloric acid electrolysis, according to the teaching of U.S. Pat. No. 6,149,782 (Sample 0). Such electrodes were tested as oxygen-consuming cathodes in a 50 cm$^2$ active area laboratory cell against a standard anode, making use of a by-product aqueous hydrochloric acid solution from an isocyanate plant. The overall cell voltage was recorded at two different current densities, namely 3 and 6 kA/m$^2$, and the corresponding values are reported in Table 1.

| Sample ID | Voltage at 3 k/Am$^2$ | Voltage at 6 kA/m$^2$ |
|---|---|---|
| 0 | 1.10 | 1.41 |
| 1a | 1.16 | 1.41 |
| 1b | 1.16 | 1.44 |
| 2a | 1.22 | 1.56 |
| 3a | 1.16 | 1.50 |
| 4a | 1.17 | 1.49 |

All of the tested electrode samples showed an acceptable catalytic activity, resulting in a modest or negligible voltage increase with respect to the state of the art rhodium sulfide electrode (Sample 0).

The above description shall not be understood as limiting the invention, which may be practiced according to different embodiments without departing from the scope thereof, and whose extent is solely defined by the appended claims.

In the description and claims of the present application, the word "comprise" and its variation such as "comprising" and "comprises" are not intended to exclude the presence of other elements or additional components.

What we claim is:

1. A method for producing a catalyst for oxygen reduction comprising the steps of subjecting a carbon black conductive support to incipient wetness impregnation by slowly adding or spraying a solution containing at least one precursor of ruthenium, drying the impregnated support and treating the resulting product under an atmosphere of hydrogen sulfide optionally diluted with an inert gas, wherein said solution comprises 2-propanol.

2. A method for producing a catalyst for oxygen reduction comprising the steps of subjecting a carbon black conductive support to incipient wetness impregnation by slowly adding or spraying a solution containing at least one precursor of ruthenium, drying the impregnated support and treating the resulting product under an atmosphere of hydrogen sulfide optionally diluted with an inert gas, wherein said drying is carried out under vacuum at a temperature above 90° C.

3. A method for producing a catalyst for oxygen reduction comprising the steps of precipitating a ruthenium oxide on a conductive carbon black support dispersed in an aqueous solution, drying the impregnated support and treating the resulting product under an atmosphere of hydrogen sulfide optionally diluted with an inert carrier gas.

4. The method of claim 3, wherein said ruthenium oxide is $RuO_2$ precipitated by reacting an aqueous solution containing a ruthenium compound, optionally $RuCl_3$, with sodium acid carbonate, or by reacting ruthenium sulfite acid with hydrogen peroxide.

5. A method for producing a catalyst for oxygen reduction comprising the steps of subjecting a carbon black conductive support to incipient wetness impregnation by slowly adding or spraying a solution containing at least one precursor of ruthenium, drying the impregnated support and treating the resulting product under an atmosphere of hydrogen sulfide optionally diluted with an inert gas, wherein said treatment under an atmosphere of hydrogen sulfide is carried out in a flow reactor.

6. A method for producing a catalyst for oxygen reduction comprising the steps of subjecting a carbon black conductive support to incipient wetness impregnation by slowly adding or spraying a solution containing at least one precursor of ruthenium, drying the impregnated support and treating the resulting product under an atmosphere of hydrogen sulfide optionally diluted with an inert gas, wherein said treatment under an atmosphere of hydrogen sulfide is carried out at a temperature exceeding 100° C.

7. A method for producing a catalyst for oxygen reduction comprising the steps of subjecting a carbon black conductive support to incipient wetness impregnation by slowly adding or spraying a solution containing at least one precursor of ruthenium, drying the impregnated support and treating the resulting product under an atmosphere of hydrogen sulfide optionally diluted with an inert gas, wherein said treatment under an atmosphere of hydrogen sulfide is protracted for a time exceeding thirty minutes.

8. A method for producing a catalyst for oxygen reduction comprising the steps of subjecting a carbon black conductive support to incipient wetness impregnation by slowly adding or spraying a solution containing at least one precursor of ruthenium, drying the impregnated support and treating the resulting product under an atmosphere of hydrogen sulfide optionally diluted with an inert gas, wherein said inert carrier gas is nitrogen and the molar ratio of said nitrogen to said hydrogen sulfide is between 0.5 and 4.

* * * * *